(12) United States Patent
Sun

(10) Patent No.: US 11,662,641 B2
(45) Date of Patent: May 30, 2023

(54) DISPLAY PANEL AND CONTROL METHOD THEREOF, AND ELECTRONIC PAPER DISPLAY APPARATUS

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventor: Dongling Sun, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 302 days.

(21) Appl. No.: 16/994,100

(22) Filed: Aug. 14, 2020

(65) Prior Publication Data
US 2021/0048720 A1  Feb. 18, 2021

(30) Foreign Application Priority Data

Aug. 16, 2019 (CN) .......................... 201910760864.6

(51) Int. Cl.
*G02F 1/167* (2019.01)
*G02F 1/16762* (2019.01)
(Continued)

(52) U.S. Cl.
CPC ............ *G02F 1/1675* (2019.01); *G02F 1/167* (2013.01); *G02F 1/1685* (2019.01);
(Continued)

(58) Field of Classification Search
CPC ............ G02F 1/167; G02F 2001/1678; G02F 1/16757; G02F 1/133614; G02F 1/133617;
(Continued)

(56) References Cited

U.S. PATENT DOCUMENTS

2006/0202949 A1  9/2006  Danner et al.
2009/0058798 A1* 3/2009  Miyazaki ............... G09G 3/035
                                                              345/107
(Continued)

FOREIGN PATENT DOCUMENTS

CN         103278991 A     9/2013
CN         106520111 A     3/2017
(Continued)

OTHER PUBLICATIONS

China National Intellectual Property Administration. Chinese Notification of the First Office Action dated Nov. 15, 2022 and Search Report dated Nov. 8, 2022. Chinese Application No. 201910760864. 6. Name of Applicant: Boe Technology Group Co., Ltd. and Hefei Boe Optoelectronics Technology Co., Ltd. Chinese Language. 8 pages.

(Continued)

*Primary Examiner* — Brandi N Thomas
(74) *Attorney, Agent, or Firm* — Procopio, Cory, Hargreaves & Savitch LLP

(57) ABSTRACT

A display panel includes at least one first electrode, a plurality of second electrodes opposite to the at least one first electrode, and a plurality of microcapsules disposed between the at least one first electrode and the plurality of microcapsules. Each microcapsule includes a plurality of charged first particles of a first color and a plurality of charged light-emitting particles. Charge polarity of the plurality of first particles is opposite to charge polarity of the plurality of light-emitting particles, and the first color is different from a color of light emitted by the plurality of light-emitting particles.

17 Claims, 10 Drawing Sheets

(51) Int. Cl.
*G02F 1/16757* (2019.01)
*G02F 1/1675* (2019.01)
*G02F 1/1685* (2019.01)

(52) U.S. Cl.
CPC ...... *G02F 1/16757* (2019.01); *G02F 1/16762* (2019.01); *G02F 2001/1678* (2013.01)

(58) Field of Classification Search
CPC ............ G02F 1/133603; G02F 1/1671; G02F 1/1685; G02F 2202/28; G02F 1/133555; G02F 1/133531; G02F 1/133536; G02F 1/133541; G02F 1/133638; G02F 1/1675; G02F 1/1681; G02F 1/094; G02F 1/133528; G02F 2202/104; G02F 2202/106; G02F 2202/107; G02F 1/13363; G02F 1/1677; G02F 2202/046; G02F 2202/36; G02F 1/0136; G02F 1/0316; G02F 1/133514; G02F 1/133526; G02F 1/133553; G02F 1/13362; G02F 1/133621; G02F 1/134363; G02F 1/136222; G02F 1/1676; G02F 2201/124; G02F 2201/52; G02F 2202/32; G02F 2203/02; G09G 3/02; G09G 2320/0238; G09G 3/2003; G09G 3/2011; G09G 3/2014; G09G 2320/0693; G09G 2360/145; G09G 3/2018; G09G 3/2081; G09G 3/2007; G09G 3/344; G09G 2300/06; G09G 2310/0205; G09G 2360/147; G09G 2360/16; G09G 2300/0426; G09G 2310/068; G09G 2320/0204; G09G 2300/0452; G09G 2300/08; G09G 2310/02; G09G 2310/06; G09G 2310/061; G09G 2320/0242; G09G 3/2074; G02B 21/0076; G02B 26/02; G02B 5/201; G02B 5/305; G02B 5/22; G02B 21/0084; G02B 5/26; G02B 5/30; G02B 6/005; G02B 6/0056; G02B 21/0004; G02B 21/0032; G02B 21/0048; G02B 21/16; G02B 26/101; G02B 26/105; G02B 26/12; G02B 3/005; G02B 3/0062; G02B 5/206; G02B 5/207; G02B 1/04; G02B 21/26; G02B 5/3083; G02B 21/008; G02B 21/0088; G02B 30/25; G02B 30/34; G02B 5/3008; G02B 5/3025; G02B 5/3058; G02B 6/0041; G02B 6/0229
See application file for complete search history.

(56) References Cited

U.S. PATENT DOCUMENTS

| 2016/0187754 | A1 | 6/2016 | Cai |
| 2016/0238917 | A1 | 8/2016 | Zhang |
| 2017/0103709 | A1* | 4/2017 | Lin ........................ G09G 3/344 |

FOREIGN PATENT DOCUMENTS

| CN | 207440492 U | | 6/2018 | |
| CN | 109445223 A | | 3/2019 | |
| DE | 102016212817 | * | 1/2018 | ............... B60Q 3/78 |

OTHER PUBLICATIONS

China National Intellectual Property Administration. Chinese Notification of the First Office Action dated Nov. 15, 2022 and Search Report dated Nov. 8, 2022. Chinese Application No. 201910760864.6. Name of Applicant: Boe Technology Group Co., Ltd. and Hefei Boe Optoelectronics Technology Co., Ltd. English Language Translation. 8 pages.

China National Intellectual Property Administration. Chinese Notification of the First Office Action and Search Report dated Nov. 8, 2022. Chinese Application No. 201910760864.4. Name of Applicant: Boe Technology Group Co., Ltd. and Hefei Boe Optoelectronics Technology Co., Ltd. Chinese Language. 8 pages.

China National Intellectual Property Administration. Chinese Notification of the First Office Action and Search Report dated Nov. 8, 2022. Chinese Application No. 201910760864.4. Name of Applicant: Boe Technology Group Co., Ltd. and Hefei Boe Optoelectronics Technology Co., Ltd. English Language Translation. 8 pages.

* cited by examiner

In a dark environment, a first voltage and a second voltage are respectively provided to a first electrode and a second electrode opposite thereto by the controller, so that a plurality of light-emitting particles in a microcapsule located between the first electrode and the second electrode move to a position closer to the first electrode than a plurality of first particles in the microcapsule — S10

In a bright environment, a third voltage and a fourth voltage are respectively provided to the first electrode and the second electrode by the controller, so that a third electric field is generated between the first electrode and the second electrode; or
in a bright environment, a fifth voltage and a sixth voltage are respectively provided to the first electrode and the second electrode by the controller, so that a fourth electric field is generated between the first electrode and the second electrode — S20

FIG. 13

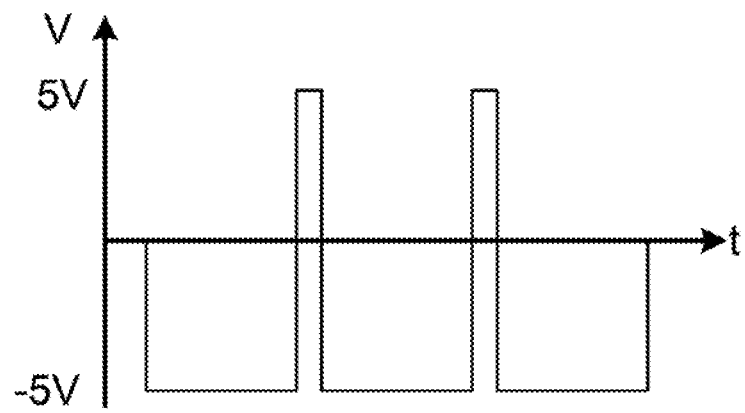

FIG. 14A

DISPLAY PANEL AND CONTROL METHOD THEREOF, AND ELECTRONIC PAPER DISPLAY APPARATUS

CROSS-REFERENCE TO RELATED APPLICATION

This application claims priority to Chinese Patent Application No. 201910760864.6 filed on Aug. 16, 2019, which is incorporated herein by reference in its entirety.

TECHNICAL FIELD

The present disclosure relates to the field of display technologies, and in particular, to a display panel and a control method thereof, and an electronic paper display apparatus.

BACKGROUND

With the rapid development of display technologies, various types of display apparatuses have appeared in the market, such as liquid crystal display (LCD) apparatuses, organic light-emitting diode (OLED) display apparatuses, and electronic paper (E-Paper) display apparatuses.

SUMMARY

In one aspect, a display panel is provided. The display panel includes at least one first electrode, a plurality of second electrodes opposite to the at least one first electrode, and a plurality of microcapsules disposed between the at least one first electrode and the plurality of microcapsules. Each microcapsule includes a plurality of charged first particles of a first color and a plurality of charged light-emitting particles. Charge polarity of the plurality of first particles is opposite to charge polarity of the plurality of light-emitting particles. The first color is different from a color of light emitted by the plurality of light-emitting particles.

In some embodiments, each microcapsule further includes a plurality of charged second particles of a second color. Charge polarity of the plurality of second particles is same as the charge polarity of the plurality of light-emitting particles, and a charge amount of each second particle is greater than a charge amount of each light-emitting particle. The second color is different from the first color.

In some embodiments, each first particle is a black particle, and each second particle is a white particle.

In some embodiments, each first particle is a white particle, and each second particle is a black particle.

In some embodiments, a material of the plurality of light-emitting particles includes a long afterglow luminescent material.

In some embodiments, each light-emitting particle includes a light-emitting core made of a long afterglow luminescent material, and a light-transmitting protection layer covering an outside surface of the light-emitting core.

In some embodiments, a material of the light-transmitting protection layer includes titanium dioxide.

In some embodiments, the light emitted by the plurality of light-emitting particles is white light.

In some embodiments, the light emitted by the plurality of light-emitting particles is light having a wavelength within a wavelength range of a color light.

In some embodiments, the plurality of microcapsules include a plurality of first microcapsules, a plurality of second microcapsules, and a plurality of third microcapsules. Colors of light emitted by light-emitting particles in the first microcapsules, the second microcapsules, and the third microcapsules are three primary colors. The display panel has a plurality of pixel regions, and each pixel region is provided with at least one first microcapsule, at least one second microcapsule, and at least one third microcapsule therein.

In some embodiments, the plurality of microcapsules includes a plurality of fourth microcapsules, a plurality of fifth microcapsules, and a plurality of sixth microcapsules. Colors of first particles in the fourth microcapsules, the fifth microcapsules, and the sixth microcapsules are three primary colors. The display panel has a plurality of pixel regions, and each pixel region is provided with at least one fourth microcapsule, at least one fifth microcapsule, and at least one sixth microcapsule therein.

In some embodiments, the at least one first electrode includes one first electrode with a planar structure. A region directly opposite to the first electrode and each second electrode is provided with at least one microcapsule therein.

In some embodiments, the at least one first electrode includes a plurality of first electrodes that are in one-to-one correspondence with the plurality of second electrodes. A region directly opposite to each first electrode and a corresponding second electrode is provided with at least one microcapsule therein.

In some embodiments, the display panel further includes a plurality of thin film transistors. A source or a drain of one of the plurality of thin film transistors is electrically connected to one of the plurality of second electrodes.

In another aspect, an electronic paper display apparatus is provided. The electronic paper display apparatus includes the display panel in the above embodiments, and a controller electrically connected to the display panel.

In yet another aspect, a control method of an electronic paper display apparatus is provided. The control method is applied to the electronic paper display apparatus in the above embodiments. In the display panel of the electronic paper display apparatus, the at least first electrode is closer to a display side of the display panel than the plurality of second electrodes. The control method includes: providing, by the controller, a first voltage and a second voltage to a first electrode and a second electrode opposite thereto respectively in a dark environment, so that a plurality of light-emitting particles in a microcapsule located between the first electrode and the second electrode move to a position closer to the first electrode than a plurality of first particles in the microcapsule.

In some embodiments, the microcapsule further includes a plurality of charged second particles of a second color. Charge polarity of the plurality of second particles is same as the charge polarity of the plurality of light-emitting particles, and a charge amount of each second particle is greater than a charge amount of each light-emitting particle. The second color is different from the first color. Providing, by the controller, a first voltage and a second voltage to a first electrode and a second electrode opposite thereto respectively in a dark environment, so that a plurality of light-emitting particles in a microcapsule located between the first electrode and the second electrode move to a position closer to the first electrode than a plurality of first particles in the microcapsule, includes: providing, by the controller, the first voltage and the second voltage to the first electrode and the second electrode respectively, at least one of the first voltage or the second voltage alternating between positive and negative, so that a first electric field and a second electric field are alternately generated between the first electrode and the second electrode. A direction of the first electric field is opposite to a direction of the second electric field, and a duration of one of the first electric field and the second electric field is greater than a duration of the other. In response to the first electric field and the second electric field that are alternately generated, the plurality of light-emitting particles move to the position closer to the first electrode than the plurality of second particles, the plurality of first particles move to a position closer to the second electrode than the plurality of second particles, and the plurality of second particles move to a position between the plurality of light-emitting particles and the plurality of first particles.

In some embodiments, in a same period, polarities of the first voltage and the second voltage are opposite.

In some embodiments, the control method further includes: providing, by the controller, a third voltage and a fourth voltage to the first electrode and the second electrode respectively in a bright environment, so that a third electric field is generated between the first electrode and the second electrode; or, providing, by the controller, a fifth voltage and a sixth voltage to the first electrode and the second electrode respectively in a bright environment, so that a fourth electric field is generated between the first electrode and the second electrode. A direction of the third electric field is opposite to a direction of the fourth electric field. In response to the third electric field, the plurality of first particles move to a position closer to the first electrode than the plurality of light-emitting particles, the plurality of second particles move to a position closer to the second electrode than the plurality of light-emitting particles, and the plurality of light-emitting particles move to a position between the plurality of first particles and the plurality of second particles. In response to the fourth electric field, the plurality of first particles move to a position closer to the second electrode than the plurality of light-emitting particles, the plurality of second particles move to a position closer to the first electrode than the plurality of light-emitting particles, and the plurality of light-emitting particles move to a position between the plurality of first particles and the plurality of second particles.

In yet another aspect, a non-transitory computer-readable storage medium is provided. The non-transitory computer readable storage medium has stored therein computer program instructions that, when executed by a processor, cause the processor to perform the control method of the electronic paper display apparatus as described in any one of the above embodiments.

BRIEF DESCRIPTION OF THE DRAWINGS

In order to describe technical solutions in the embodiments of the present disclosure more clearly, accompanying drawings to be used in some embodiments of the present disclosure will be introduced briefly. However, the accompanying drawings to be described below are merely accompanying drawings of some embodiments of the present disclosure, and a person of ordinary skill in the art may obtain other drawings according to these drawings. In addition, accompanying drawings in the following description may be regarded as schematic diagrams, and are not limitations on an actual size of a product, an actual process of a method and an actual timing of signals involved in the embodiments of the present disclosure.

FIG. 13 is a flowchart of a control method of the electronic paper display apparatus, according to some embodiments;

FIG. 14A is a schematic diagram of a voltage applied to a second electrode, according to some embodiments;

DETAILED DESCRIPTION

Figure 1:
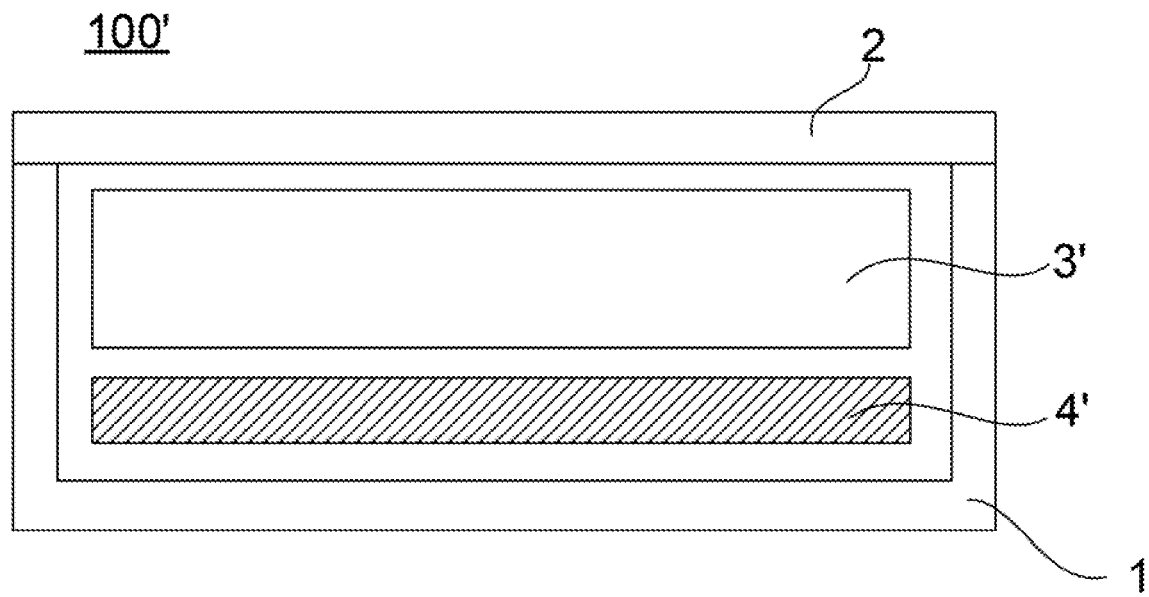
FIG. 1 is a structural diagram of an electronic paper display apparatus.

Technical solutions in some embodiments of the present disclosure will be described clearly and completely with reference to the accompanying drawings. However, the described embodiments are merely some but not all of embodiments of the present disclosure. All other embodiments obtained by a person of ordinary skill in the art based on the embodiments provided by the present disclosure shall be included in the protection scope of the present disclosure.

Unless the context requires otherwise, throughout the Description and the claims, the term "comprise" and other forms thereof such as the third-person singular form "comprises" and the present participle form "comprising" are construed as open and inclusive, i.e., "included, but not limited to". In the description of the Description, terms such as "one embodiment". "some embodiments", "exemplary embodiments", "example", "specific example" or "some examples" are intended to indicate that specific features, structures, materials or characteristics related to the embodiment(s) or the example(s) are included in at least one embodiment or example of the present disclosure. Schematic representations of the above terms do not necessarily refer to the same embodiment(s) or example(s). In addition, the specific features, structures, materials or characteristics may be included in any or more embodiments/examples in any suitable manner.

Terms such as "first" and "second" are only used for descriptive purposes, and are not to be construed as indicating or implying the relative importance or implicitly indicating the number of indicated technical features below. Thus, features defined as "first" and "second" may explicitly or implicitly include one or more of the features. In the description of the embodiments of the present disclosure, the term "a/the plurality of" means two or more unless otherwise specified. The term "and/or" is only described a relationship of association objects, which represents three relationships, for example, "A and/or B" represents three conditions: A exists alone. A and B exist simultaneously, and B exists alone.

Exemplary embodiments are described herein with reference to sectional diagrams and/or plan diagrams as idealized exemplary drawings. In the accompanying drawings, thicknesses of layers and/or regions are enlarged for clarity. Therefore, variations in shapes with respect to the drawings due to, for example, manufacturing techniques and/or tolerances are conceivable. Therefore, exemplary embodiments should not be construed as being limited to the shapes of the regions shown herein, but include shape deviations due to, for example, manufacturing. Therefore, the regions illustrated in the drawings are schematic and their shapes are not intended to illustrate the actual shapes of the regions in an apparatus and are not intended to limit the scope of the exemplary embodiments.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled" or "communicatively coupled", however, may also mean that two or more elements are not in direct contact with each other, but yet still co-operate or interact with each other. The embodiments disclosed herein are not necessarily limited in this context.

Compared with the traditional LCD apparatus, the E-paper display apparatus can realize display by reflecting external light without using a backlight source. In this way, the E-paper display apparatus may avoid visual fatigue caused by the backlight source. Thus, the E-paper display apparatus has soft display effect, no glare and no flicker, and the visual effect thereof is close to that of the paper printed matters.

FIG. 1 is a structural diagram of an electronic paper display apparatus 100'. The electronic paper display apparatus 100' may be, for example, an electronic paper reader (also referred to as an electronic paper book), a smart watch, a mobile phone, an electronic newspaper, or the like.

As shown in FIG. 1, the electronic paper display apparatus 100' includes a frame 1, a cover plate 2, a display panel 3', a circuit board 4' and other electronic accessories. An accommodating space is surrounded by the frame 1, and the display panel 3', the circuit board 4' and the other electronic accessories are disposed in the accommodating space. The cover plate 2 is disposed on an open side of the frame 1, and the display panel 3' is disposed on a side of the circuit board 4' facing the cover plate 2.

Figure 2:
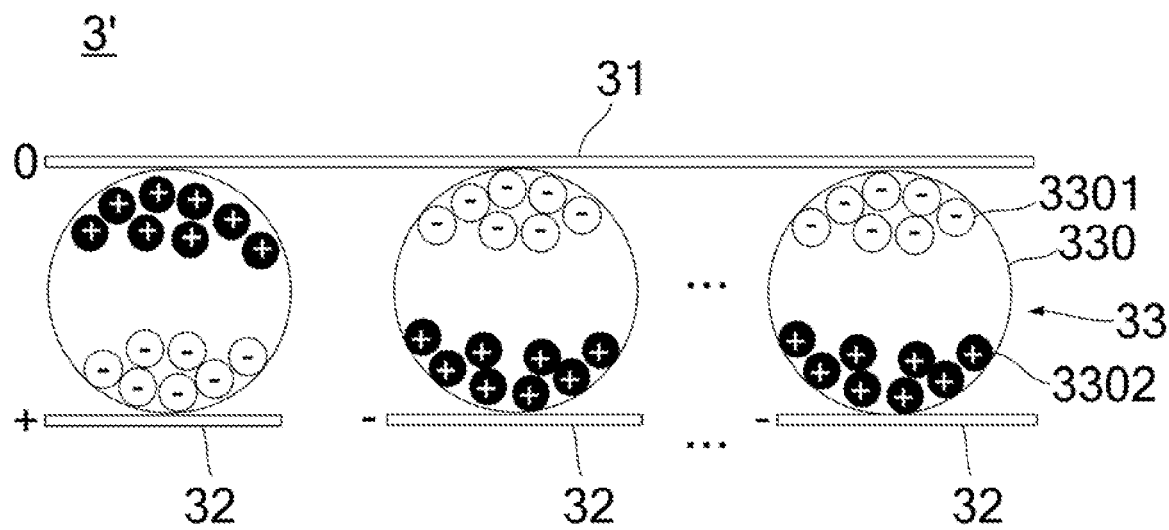
FIG. 2 is a structural diagram of a display panel in the electronic paper display apparatus shown in FIG. 1.

FIG. 2 is a structural diagram of the display panel 3. As shown in FIG. 2, the display panel 3' includes a top electrode 31, a plurality of bottom electrodes 32, and an electrophoretic layer 33 located between the top electrode 31 and the bottom electrodes 32. The top electrode 31 is closer to a display side of the display panel 3' than the bottom electrodes 32. The electrophoretic layer 33 includes a plurality of tiny capsule-shaped particles 330 (i.e., microcapsules). Each microcapsule 330 includes a plurality of charged white particles 3301 and a plurality of charged black particles 3302, and charge polarities of the two types of particles are opposite. In a region directly opposite to the top electrode 31 and each bottom electrode 32, the white particles 3301 and the black particles 3302 may move towards different electrodes under the action of an electric field generated by the top electrode 31 and the bottom electrode 32.

Here, the display side means a side of the display panel 3' where a user can watch an image on it.

The working principle of the display panel 3' will be described in an example where the white particles 3301 are negatively charged and the black particles 3302 are positively charged.

As shown in FIG. 2, in a case where no voltage (i.e., a zero voltage represented by the number 0) is applied to the top electrode 31 and a positive voltage (represented by the symbol "+") is applied to one bottom electrode 32, in one microcapsule 330 located between the top electrode 31 and this bottom electrode 32, the positively charged black particles 3302 (represented by the symbol "+") are repelled by the bottom electrode 32, so as to move towards the top electrode 31, and the negatively charged white particles 3301 (represented by the symbol "−") are attracted by the bottom electrode 32, so as to move towards the bottom electrode 32.

In a region directly opposite to the top electrode 31 and this bottom electrode 32, since the black particles 3302 are closer to the display side of the display panel 3' than the white particles 3301, the black particles 3302 can absorb ambient light (i.e., light in an environment where the display panel 3' is located) irradiating thereon, so that a region of the display side of the display panel 3' opposite to the microcapsule 330 displays black.

As shown in FIG. 2, in a case where no voltage (i.e., a zero voltage represented by the number 0) is applied to the top electrode 31 and a negative voltage (represented by the symbol "−") is applied to another bottom electrode 32, in one microcapsule 330 located between the top electrode 31 and this bottom electrode 32, the negatively charged white particles 3301 are repelled by the bottom electrode 32, so as to move towards the top electrode 31, and the positively charged black particles 3302 are attracted by the bottom electrode 32, so as to move towards the bottom electrode 32.

In a region directly opposite to the top electrode 31 and this bottom electrode 32, since the white particles 3301 are closer to the display side of the display panel 3' than the black particles 3302, the white particles 3301 can reflect ambient light (i.e., light in an environment where the display panel 3' is located) irradiating thereon, so that a region of the display side of the display panel 3' opposite to the microcapsule 330 displays white.

Based on the working principle, by controlling electric fields generated by the top electrode 31 and different bottom electrodes 32, different regions of the display side of the display panel 3' can display different colors, for example, some regions display black, and other regions display white, thereby displaying an image (e.g., characters).

The above-mentioned display panel 3' needs to display an image in an environment with light (i.e., a bright environment), and cannot display an image in an environment without light or with light of very low brightness (i.e., a dark environment).

As shown in FIGS. 3 to 11, some embodiments of the present disclosure provide a display panel 3, which may be applied to an electronic paper display apparatus.

Figure 3:
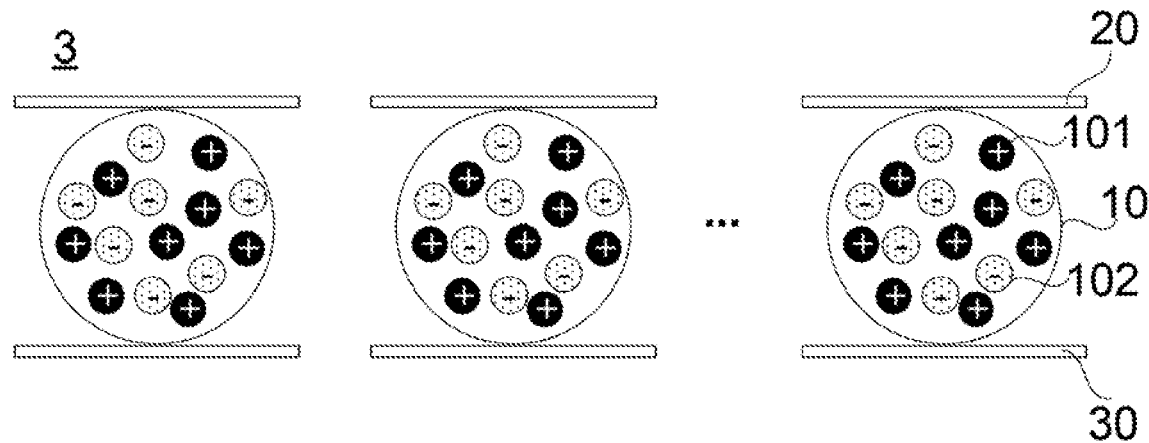
FIG. 3 is a structural diagram of a display panel, according to some embodiments.

FIG. 3 is a structural diagram of the display panel 3. As shown in FIG. 3, the display panel 3 includes at least one first electrode 20, a plurality of second electrodes 30 opposite to the at least one first electrode 20, and a plurality of microcapsules 10 disposed between the at least one first electrode 20 and the plurality of second electrodes 30.

A shape of each microcapsule 10 is not limited to a spherical shape as shown in FIGS. 3 to 11. In some examples, the shape of the microcapsule 10 is a cube or a trapezoid. That is, a sectional shape of the microcapsule 10 is rectangular or trapezoidal along a thickness direction of the display panel 3.

The microcapsule 10 has a transparent or substantially transparent capsule wall (i.e., a capsule shell), so that the microcapsule 10 has a certain shape. The microcapsule 10 includes a plurality of charged first particles 101 of a first color and a plurality of charged light-emitting particles 102. Charge polarity of the first particles 101 is opposite to charge polarity of the light-emitting particles 102. A color of light emitted by the light-emitting particles 102 is different from the first color of the first particles 101.

In some embodiments, the at least one first electrode 20 is closer to a display side of the display panel 3 than the second electrodes 30. That is, ambient light (i.e., light in an environment where the display panel 3 is located) can pass through the at least one first electrode 20 to reach the microcapsule 10. In some other embodiments, the second electrodes 30 are closer to the display side of the display panel 3 than the at least one first electrode 20. That is, ambient light (i.e., light in an environment where the display panel 3 is located) can pass through the second electrodes 30 to reach the microcapsule 10.

Here, the display side means a side of the display panel 3 where a user can watch an image on it.

For convenience of description, the following embodiments of the present disclosure will be described in an example where the at least one first electrode 20 is closer to the display side of the display panel 3 than the second electrodes 30. However, it will be understood that for another display panel in which the second electrodes 30 are closer to the display side of the display panel 3 than at least one first electrode 20, display can also be achieved.

In a case where the at least one first electrode 20 is closer to the display side of the display panel 3 than the second electrodes 30, the at least one first electrode 20 is transparent or translucent, so that ambient light can pass through the at least one first electrode 20 to reach the microcapsule 10. A material of the at least one first electrode 20 may include, for example, one or more of indium zinc oxide (IZO), indium tin oxide (ITO), or zinc aluminum oxide (AZO).

A material of the second electrodes 30 is not limited in some embodiments of the present disclosure. For example, the second electrodes 30 are transparent or translucent, and a material of the second electrodes 30 may include, for example, one or more of ITO, IZO, or AZO. Or, the second electrodes 30 are non-transparent, a material of the second electrodes 30 may include one or more of metal materials, such as argentum (Ag), copper (Cu), and aluminum (Al).

The charge polarity of the first particles 101 is opposite to the charge polarity of the light-emitting particles 102. In some examples, the first particles 101 may be positively charged and the light-emitting particles 102 may be negatively charged. In some other examples, the first particles 101 may be negatively charged and the light-emitting particles 102 may be positively charged.

For convenience of description, the following embodiments of the present disclosure will be described in an example where the first particles 101 are positively charged (represented by the symbol "+") and the light-emitting particles 102 are negatively charged (represented by the symbol "−"). However, it will be understood that for another display panel in which the first particles 101 are negatively charged and the light-emitting particles 102 are positively charged, display can also be achieved.

By applying different voltages to each second electrode 30 and a corresponding first electrode 20, the first particles 101 and the light-emitting particles 102 in the microcapsule (s) 10 located between the first electrode 20 and the second electrode 30 can move towards different electrodes. Therefore, the first particles 101 can reflect or absorb ambient light irradiating thereon, or the light-emitting particles 102 can emit light of a certain color. In this way, the microcapsule 10 may display the first color of the first particles 101 or the color of the light emitted by the light-emitting particles 102, and a region of the display side of the display panel 3 opposite to the microcapsule 10 may display the first color or the color of the light emitted by the light-emitting particles 102.

Figure 4A:
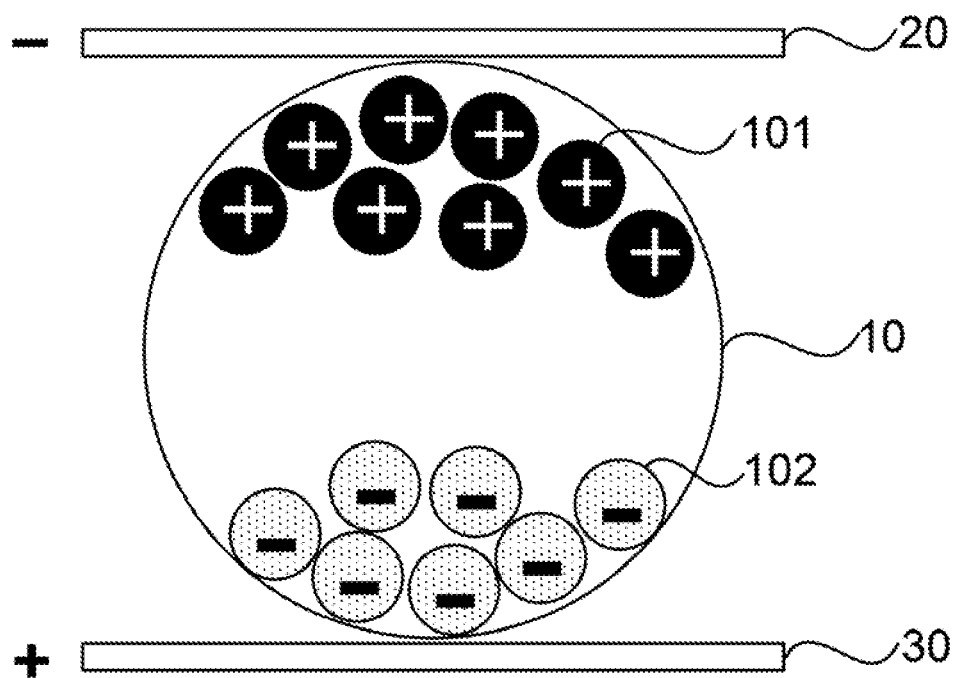
FIG. 4A is a schematic diagram of a microcapsule in the display panel shown in FIG. 3 displaying a first color.

As shown in FIG. 4A, in a case where a negative voltage (represented by the symbol "−") is applied to the first electrode 20, and a positive voltage (represented by the symbol "+") is applied to the second electrode 30, an electric field directed from the second electrode 30 to the first electrode 20 is generated between the first electrode 20 and the second electrode 30. In this case, the positively charged first particles 101 move towards the first electrode 20, and the negatively charged light-emitting particles 102 move towards the second electrode 30. In a case where the first electrode 20 is closer to the display side of the display panel 3 than the second electrode 30, the microcapsule 10 located between the first electrode 20 and the second electrode 30 displays the first color. That is, the region of the display side of the display panel 3 opposite to the microcapsule 10 displays the first color.

As shown in FIG. 46, in a case where a positive voltage (represented by the symbol "+") is applied to the first electrode 20, and a negative voltage (represented by the symbol "−") is applied to the second electrode 30, an electric field directed from the first electrode 20 to the second electrode 30 is generated between the first electrode 20 and the second electrode 30. In this case, the positively charged first particles 101 move towards the second electrode 30, and the negatively charged light-emitting particles 102 move towards the first electrode 20. In the case where the first electrode 20 is closer to the display side of the display panel 3 than the second electrode 30, the microcapsule 10 located between the first electrode 20 and the second electrode 30 displays the color of the light emitted by the light-emitting particles 102. That is, the region of the display side of the display panel 3 opposite to the microcapsule 10 displays the color of the light emitted by the light-emitting particles 102.

In some examples, the light-emitting particles 102 emit white light, and the first particles 101 are black particles. That is, the first particles 101 can absorb ambient light irradiating thereon to display black. In this way, the display panel 3 may realize a black and white display. For example, in an image displayed by the display panel 3, a background color may be white, and a color of patterns (e.g., characters)

may be black. Or, in an image displayed by the display panel 3, a background color may be black, and a color of patterns (e.g., characters) may be white.

In some other examples, the light-emitting particles 102 emit green light, and the first particles 101 are white particles. That is, the first particles 101 can reflect ambient light irradiating thereon to display white. In this way, the display panel 3 may realize a white and green display. For example, in an image displayed by the display panel 3, a background color may be green, and a color of patterns (e.g., characters) may be white. Or, in an image displayed by the display panel 3, a background color may be white, and a color of patterns (e.g., characters) may be green.

It will be noted that, the color of the first particles 101 includes but is not limited to the above-mentioned colors, and the color of the light emitted by the light-emitting particles 102 includes but is not limited to the above-mentioned colors. The color of the first particles 101 and the color of the light emitted by the light-emitting particles 102 may be selected according to actual display needs, which is not limited in the embodiments of the present disclosure.

In the display panel 3 provided by the embodiments of the present disclosure, the charge polarity of the first particles 101 in the microcapsule 10 is opposite to the charge polarity of the light-emitting particles 102, and the color of the light emitted by the light-emitting particles 102 is different from the first color of the first particles 101. Therefore, a display of the display panel 3 in an bright environment (i.e., an environment with light) is not affected. Moreover, since the light-emitting particles 102 in the microcapsule 10 can emit light, the display panel 3 may realize display even in a dark environment (i.e., an environment without light or with light of very low brightness). Therefore, the display panel 3 provided by the embodiments of the present disclosure may be used in both the bright environment and the dark environment, an application of the display panel 3 will not be limited by an usage environment, and an usage range of the display panel 3 may be expanded.

In some embodiments, a material of the light-emitting particles 102 may be a long afterglow luminescent material, a cathodoluminescent material, or a radioluminescent material. The long afterglow luminescent material can emit light under an excitation of light (e.g., visible light and/or ultraviolet light), and continue to emit light for a long time after the excitation is stopped. Light-emitting time of some long afterglow luminescent materials may last for more than 30 hours. Therefore, in some embodiments, the material of the light-emitting particles 102 includes the long afterglow luminescent material.

The light-emitting principle of the long afterglow luminescent material is that: in the bright environment, the long afterglow luminescent material can absorb ambient light irradiating thereon, so that electrons in the long afterglow luminescent material may transfer from a low-level energy band to a high-level energy band. After the ambient light disappears (i.e. in the dark environment), the electrons will return from the high-level energy band to the low-level energy band. During this returning process, a part of energy of the absorbed light is released in a long afterglow luminescent manner.

Figure 4B:
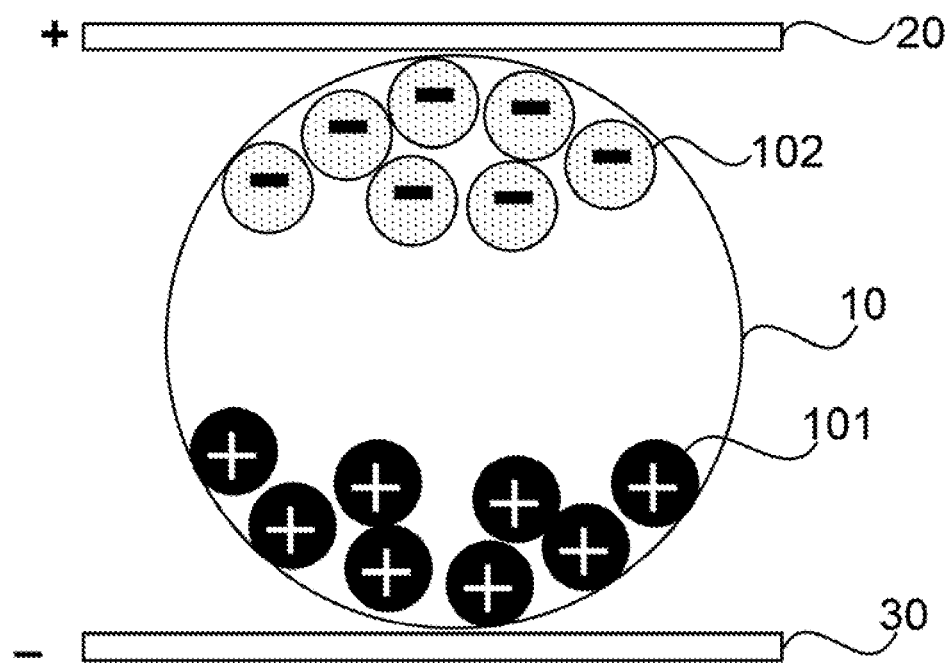
FIG. 4B is a schematic diagram of the microcapsule in the display panel shown in FIG. 3 displaying a color of light emitted by light-emitting particles.

As shown in FIG. 4A, the first particles 101 are gathered below the first electrode 20 under the action of the electric field. In a case where the first particles 101 are black particles and the display panel 3 is in the bright environment, the first particles 101 absorb ambient light irradiating thereon, so that the microcapsule 10 displays black. And, ambient light can reach the light-emitting particles 102 located below the first particles 101 from gaps between the first particles 101. The light-emitting particles 102 can store a part of the energy of the received light. As shown in FIG. 4B, the light-emitting particles 102 are gathered below the first electrode 20 under the action of the electric field. In a case where the display panel 3 is in the dark environment, the light-emitting particles 102 can release the stored energy in a form of emitting light. The light passes through the first electrode 20, so that the microcapsule 10 displays the color of the light emitted by the light-emitting particles 102. Therefore, the display panel 3 can display an image in both the bright environment and the dark environment.

In addition, in some embodiments, when the display panel 3 is not in use, the first particles 101 and the light-emitting particles 102 are not driven by an electric field, so that they are dispersed at random in the microcapsule 10, and the light-emitting particles 102 may also receive ambient light.

The embodiments of the present disclosure do not limit the long afterglow luminescent material. A corresponding material may be selected according to a color of light required to be emitted by the light-emitting particles 102. For example, the long afterglow luminescent material may include one or more of a sulfide long afterglow luminescent material, an aluminate long afterglow luminescent material, or a silicate long afterglow luminescent material.

Figure 5:
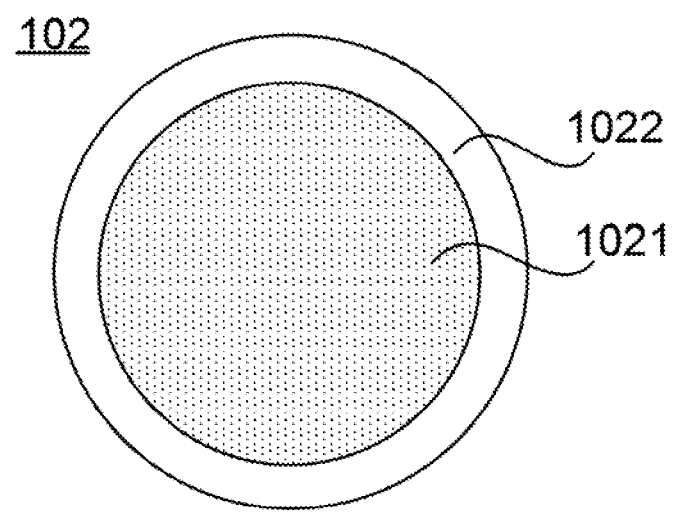
FIG. 5 is a structural diagram of a light-emitting particle, according to some embodiments.

In some embodiments, the light-emitting particles 102 may have a structure shown in FIG. 5. As shown in FIG. 5, each light-emitting particle 102 includes a light-emitting core 1021 made of a long afterglow luminescent material, and a light-transmitting protection layer 1022 covering an outside surface of the light-emitting core 1021.

Since the light-emitting core 1021 has high activity, if it is in contact with water vapor, oxygen or the like from an external environment, it is prone to deliquescence or oxidation, thereby causing degradation of luminescent performance. The protection layer 1022 can isolate the light-emitting core 1021 from water vapor, oxygen, or the like in the environment, so as to prevent the environment from affecting the luminescent performance of the light-emitting core 1021. The embodiments of the present disclosure do not limit a material of the protection layer 1022. For example, the material of the protection layer 1022 may be titanium dioxide, silicon nitride, silicon dioxide, or silicon oxynitride.

Here, on the basis of ensuring that the protection layer 1022 can uniformly cover the light-emitting core 1021, a thickness of the protection layer 1022 should be as small as possible to avoid reducing the light transmittance. For example, the thickness of the protection layer 1022 is within a range from 5 nm to 300 nm, such as 5 nm, 50 nm, 100 nm, 150 nm, 200 nm, 250 nm, or 300 nm. In addition, the light-emitting particle 102 having the protection layer 1022 of a certain thickness may be obtained by different preparation processes. For example, the light-emitting particle 102 may be prepared by a sol-gel method, and the thickness of the protection layer 1022 is within a range from 150 nm to 300 nm; or the light-emitting particle 102 may be prepared by a sputtering method, and the thickness of the protection layer 1022 is within a range from 5 nm to 180 nm.

Figure 6:
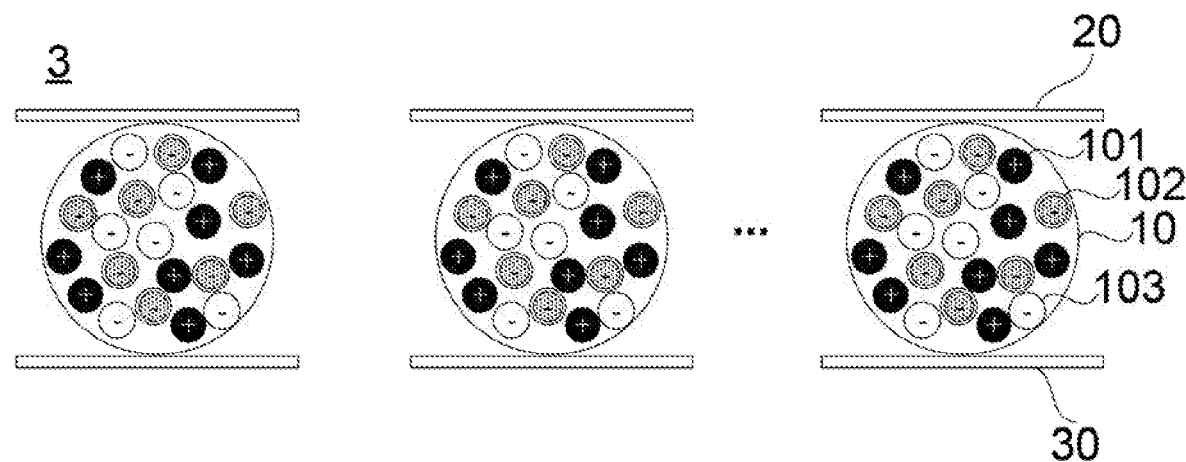
FIG. 6 is a structural diagram of another display panel, according to some embodiments.

In some embodiments, as shown in FIG. 6, the microcapsule 10 in the display panel 3 further includes a plurality of charged second particles 103 of a second color. Charge polarity of the second particles 103 is the same as the charge polarity of the light-emitting particles 102. A charge amount of each second particle 103 is greater than a charge amount of each light-emitting particle 102.

It will be understood that the first color and the second color are different. In addition, in some embodiments, when the display panel 3 is not in use, the first particles 101, the light-emitting particles 102 and the second particles 103 are not driven by an electric field, so that they are dispersed at random in the microcapsule 10, and the light-emitting particles 102 may also receive ambient light.

For example, in the case where the first particles 101 are positively charged and the light-emitting particles 102 are negatively charged, the second particles 103 are also negatively charged (represented by the symbol "−"). In the case where the first particles 101 are negatively charged and the light-emitting particles 102 are positively charged, the second particles 103 are also positively charged (represented by the symbol "+").

For convenience of description, the following embodiments of the present disclosure are described in an example where the first particles 101 are positively charged, and the light-emitting particles 102 and the second particles 103 are both negatively charged.

According to the theory related to electrophoresis technology, in an electric field, a moving distance of a charged particle per unit time is mainly related to its charge amount and mass. Since masses of different charged particles in the microcapsule 10 are very small, or, the different charged particles in the microcapsule 10 may be usually prepared to have the same mass or approximately the same mass, the effect of the mass on moving distances of different charged particles may be ignored.

Based on the above theory, in the embodiments of the present disclosure, since the charge amount of the second particle 103 in the microcapsule 10 is greater than the charge amount of the light-emitting particle 102, a moving distance of the second particle 103 in the microcapsule 10 per unit time is greater than a moving distance of the light-emitting particle 102 per unit time. That is, a moving speed of the second particle 103 is greater than a moving speed of the light-emitting particle 102.

In the bright environment, in a case where different voltages are applied to the first electrode 20 and the second electrode 30 of the display panel 3, a stable or substantially stable electric field (that is, a direction of the electric field does not change) is generated between the first electrode 20 and the second electrode 30. In this case, since the charge polarity of the second particles 103 is the same as the charge polarity of the light-emitting particles 102 (e.g., both are negatively charged), and the moving speed of the second particles 103 is greater than the moving speed of the light-emitting particles 102, the second particles 103 will first move towards one electrode that has a polarity opposite to the polarity of the second particles 103 and the light-emitting particles 102 relative to the light-emitting particles 102. The first particles 101 (positively charged) will move towards the other electrode, and the light-emitting particles 102 move to a position between the second particles 103 and the first particles 101.

By applying different voltages to the first electrode 20 and the second electrode 30, an electric field is generated between the first electrode 20 and the second electrode 30. Therefore, the first particles 101 or the second particles 103 may be controlled to move towards the first electrode 20 that is closer to the display side of the display panel 3 than the second electrode 30, so that the region of the display side of the display panel 3 opposite to the microcapsule 10 displays the first color of the first particles 101 or the second color of the second particles 103.

Figure 7A:
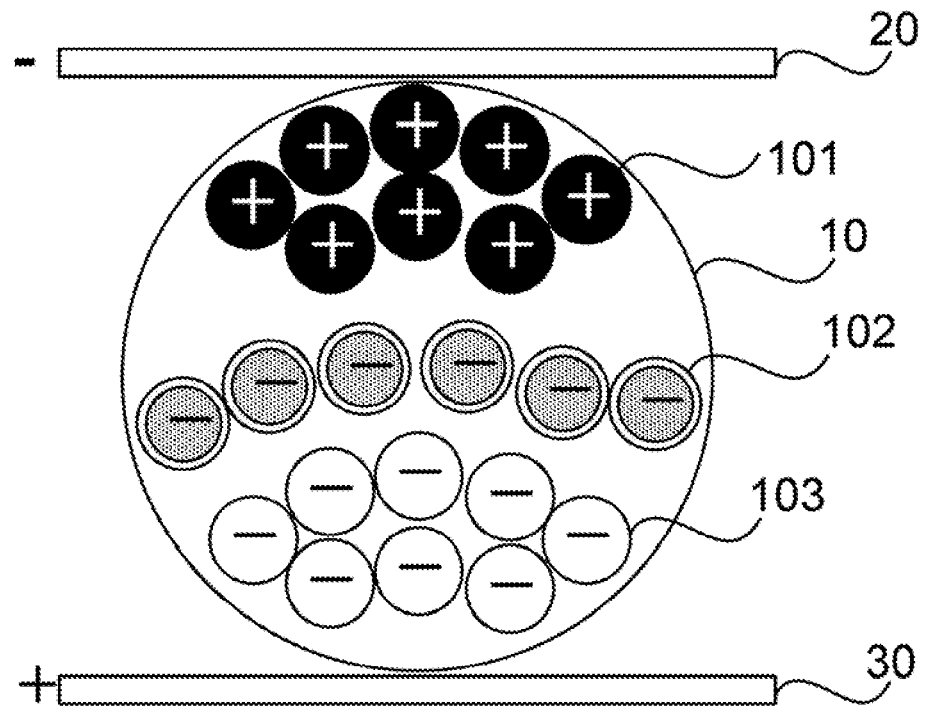
FIG. 7A is a schematic diagram of a microcapsule in the display panel shown in FIG. 6 displaying a first color.

As shown in FIG. 7A, in a case where a negative voltage (represented by the symbol "−") and a positive voltage (represented by the symbol "+") are respectively applied to the first electrode 20 and the second electrode 30, the negatively charged first particles 101 move towards the first electrode 20, and finally are gathered below the first electrode 20, and the positively charged second particles 103 and the light-emitting particles 102 move towards the second electrode 30. Since the moving speed of the second particles 103 is greater than the moving speed of the light-emitting particles 102, the second particles 103 finally move to a position closer to the second electrode 30 than light-emitting particles 102, and the light-emitting particles 102 move to a position between the first particles 101 and the second particles 103.

In this case, since the first electrode 20 is closer to the display side of the display panel 3 than the second electrode 30, the microcapsule 10 displays the first color, and the region of the display side of the display panel 3 opposite to the microcapsule 10 displays the first color.

Figure 7B:
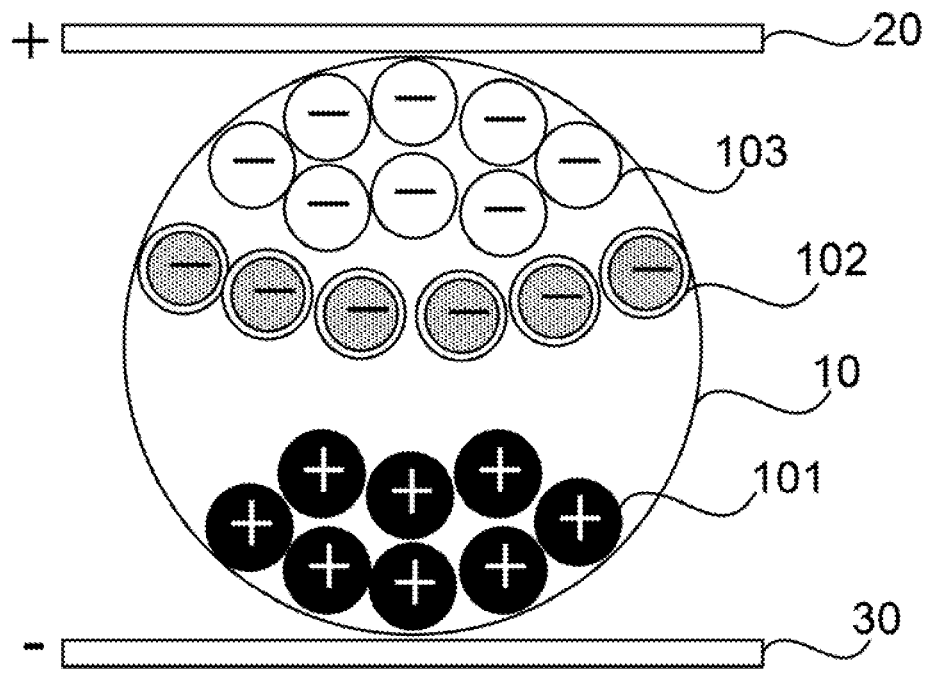
FIG. 7B is a schematic diagram of the microcapsule in the display panel shown in FIG. 6 displaying a second color.

As shown in FIG. 7B, in a case where a positive voltage (represented by the symbol "+") and a negative voltage (represented by the symbol "−") are respectively applied to the first electrode 20 and the second electrode 30, the negatively charged first particles 101 move towards the second electrode 30, and finally are gathered above the second electrode 30, and the positively charged second particles 103 and the light-emitting particles 102 move towards the first electrode 20. Since the moving speed of the second particles 103 is greater than the moving speed of the light-emitting particles 102, the second particles 103 finally move to a position closer to the first electrode 20 than light-emitting particles 102, and the light-emitting particles 102 move to a position between the first particles 101 and the second particles 103.

In this case, since the first electrode 20 is closer to the display side of the display panel 3 than the second electrode 30, the microcapsule 10 displays the second color, and the region of the display side of the display panel 3 opposite to the microcapsule 10 displays the second color.

In this way, the display panel 3 provided by some embodiments of the present disclosure may realize display based on the first particles 101 and the second particles 103.

In the dark environment, by applying alternating voltages to the first electrode 20 and the second electrode 30, two electric fields having opposite directions (durations of the two electric fields being different) may be alternately generated between the first electrode 20 and the second electrode 30. Under the combined action of the two electric fields having opposite directions, the light-emitting particles 102 finally move to a position closer to the first electrode 20 than the second particles 103. Since the first electrode 20 is closer to the display side of the display panel 3 than the second electrode 30, the region of the display side of the display panel 3 opposite to the microcapsule 10 displays the color of the light emitted by the light-emitting particles 102.

Figure 8:
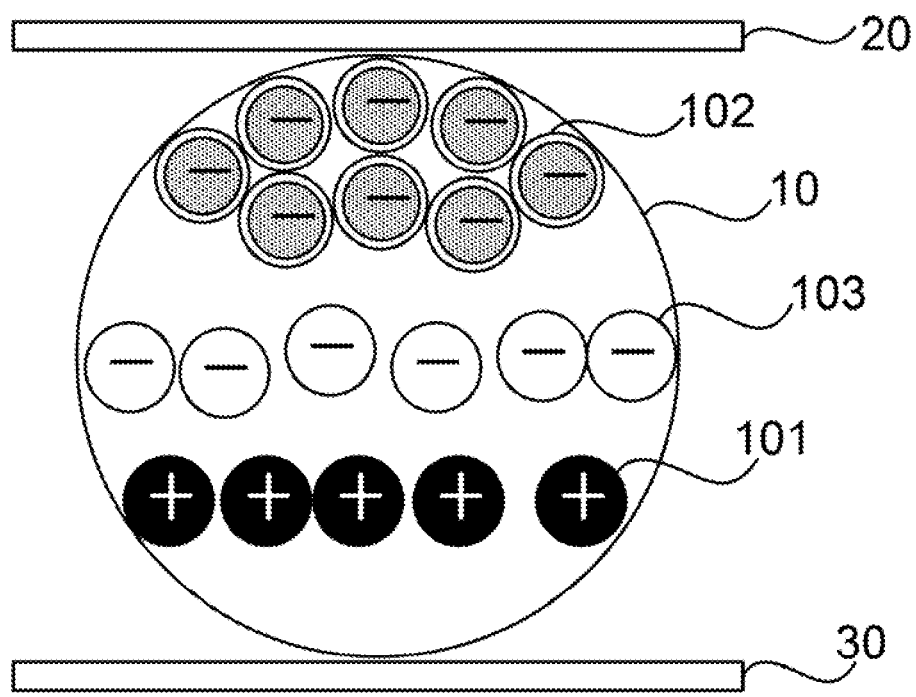
FIG. 8 is a schematic diagram of the microcapsule in the display panel shown in FIG. 6 displaying a color of light emitted by light-emitting particles in a dark environment.

As shown in FIG. 8, under the combined action of the two alternating electric fields having opposite directions, the light-emitting particles 102 may move towards the first electrode 20 and finally are gathered below the first electrode 20, and the first particles 101 move towards the second electrode 30 and finally are gathered above the second electrode 30. The second particles 103 move a position between the first particles 101 and the light-emitting particles 102. In this case, since the first electrode 20 is closer to the display side of the display panel 3 than the second electrode 30, the microcapsule 10 displays the color of the light emitted by the light-emitting particles 102, and the region of the display side of of the display panel 3 opposite to the microcapsule 10 displays the color of the light emitted by the light-emitting particles 102.

It will be seen that, in the dark environment, the light-emitting particles 102 may move to a position of the second particles 103 in the bright environment, and replace the second particles 103 for display. Moreover, although the display panel 3 is in the dark environment, since the light-emitting particles 102 may emit light, the light-emitting particles 102 may provide light required for display to the display panel 3. That is, in the dark environment, the display panel 3 provided by some embodiments of the present disclosure may also realize display based on the light-emitting particles 102.

In the above embodiments, in the dark environment, as to how to control the voltages applied to the first electrode 20 and the second electrode 30, so that two electric fields having opposite directions are alternately generated between the first electrode 20 and the second electrode 30, and the second particles 103 are finally move the position between the first particles 101 and the light-emitting particles 102, the following embodiments of the present disclosure will be described in detail.

In the bright environment, the display panel 3 may realize display based on the first particles 101 and the second particles 103. In the dark environment, the display panel 3 may realize display based on the light-emitting particles 102. On this basis, two colors that can be easily distinguished by the human eyes may be selected as the colors of the first particles 101 and the second particles 103. Therefore, in the bright environment, the human eyes may distinguish the patterns (e.g., characters) and the background easily, and the display effect of the display panel 3 is improved.

For example, in some embodiments, the first particles 101 may be black particles, and the second particles 103 may be white particles. Or, the first particles 101 are white particles, and the second particles 103 are black particles. In this case, the display panel 3 may realize the black and white display in the bright environment.

Here, the black particles are, for example, carbon black particles, and the white particles are, for example, titanium dioxide particles.

In some embodiments, the light emitted by the light-emitting particles 102 is white light.

As described above, in a case where the microcapsule 10 of the display panel 3 includes only the first particles 101 and the light-emitting particles 102, the display panel 3 realizes display based on the first particles 101 and the light-emitting particles 102. It is easy to understand that, in the case where the light emitted by the light-emitting particles 102 is white light, the color of the first particles 101 affects the color displayed by the display panel 3. For example, in the case where the first particles 101 are black particles, the display panel 3 may realize the black and white display. Or, in a case where the first particles 101 are green particles, the display panel 3 may realize a white and green display.

In some other embodiments, the light emitted by the light-emitting particles 102 is light having a wavelength within a wavelength range of a single color light, such as red light, green light, and blue light.

In some embodiments, the plurality of microcapsules 10 may include a plurality of first microcapsules 10a, a plurality of second microcapsules 10b, and a plurality of third microcapsules 10c. A color of light emitted by light-emitting particles 102 in the first microcapsules 10a, a color of light emitted by light-emitting particles 102 in the second microcapsules 10b, and a color of light emitted by light-emitting particles 102 in the third microcapsules 10c are three primary colors, such as red, green and blue.

Figure 9A:
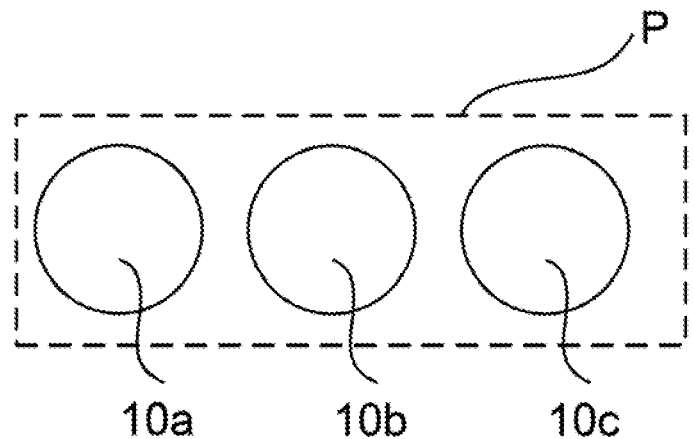
FIG. 9A is a schematic diagram of a pixel region of yet another display panel, according to some embodiments.

The display panel 3 has a plurality of pixel regions. As shown in FIG. 9A, each pixel region P is provided with at least one first microcapsule 10a, at least one second microcapsule 10b, and at least one third microcapsule 10c therein.

In this case, the microcapsule 10 is equivalent to a sub-pixel (i.e., a basic unit that can display an image). The display panel 3 may realize a color display by a cooperation of the first microcapsules 10a, the second microcapsules 10b, and the third microcapsules 10c.

For example, the first color displayed by the first particles 101 may serve as a background color, and the color of the light emitted by the light-emitting particles 102 may be serve as the color of the patterns. In the dark environment, the display panel 3 may realize the display based on the light-emitting particles 102, that is, the display panel 3 may realize a color display of the patterns.

In some other embodiments, the plurality of microcapsules 10 include a plurality of fourth microcapsules 10d, a plurality of fifth microcapsules 10e, and a plurality of sixth microcapsules 10f. A color of first particles 101 in the fourth microcapsules 10d, a color of first particles 101 in the fifth microcapsules 10e, and a color of first particles 101 in the sixth microcapsules 10f are three primary colors, such as red, green, and blue.

For example, the first particles 101 in the fourth microcapsules 10d, the first particles 101 in the fifth microcapsules 10e, and the first particles 101 in the sixth microcapsules 10f are red particles, green particles, and blue particles, respectively. These particles of different colors may be made with dyes of corresponding colors.

Figure 9B:
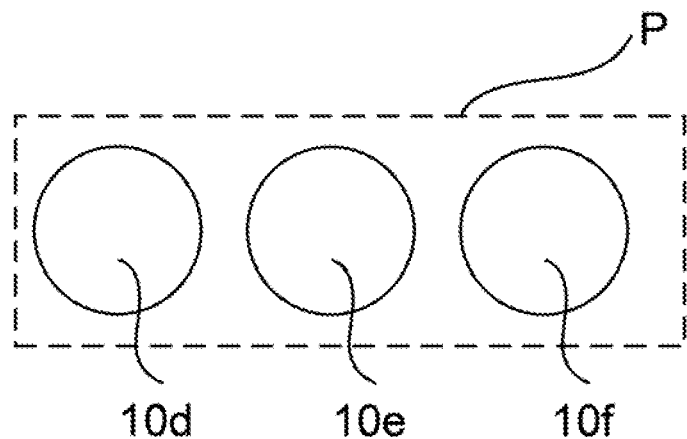
FIG. 9B is a schematic diagram of a pixel region of yet another display panel, according to some embodiments.

The display panel 3 has a plurality of pixel regions. As shown in FIG. 9B, each pixel region P is provided with at least one fourth microcapsule 10d, at least one fifth microcapsule 10e, and at least one sixth microcapsule 10f therein.

In this case, the microcapsule 10 is equivalent to a sub-pixel (i.e., a basic unit that can display an image). The display panel 3 may realize a color display by a cooperation of the fourth microcapsules 10d, the fifth microcapsules 10e, and the sixth microcapsules 10f.

For example, three primary colors displayed by the first particles 101 in different microcapsules 10 may serve as the colors of the patterns.

Figure 10:
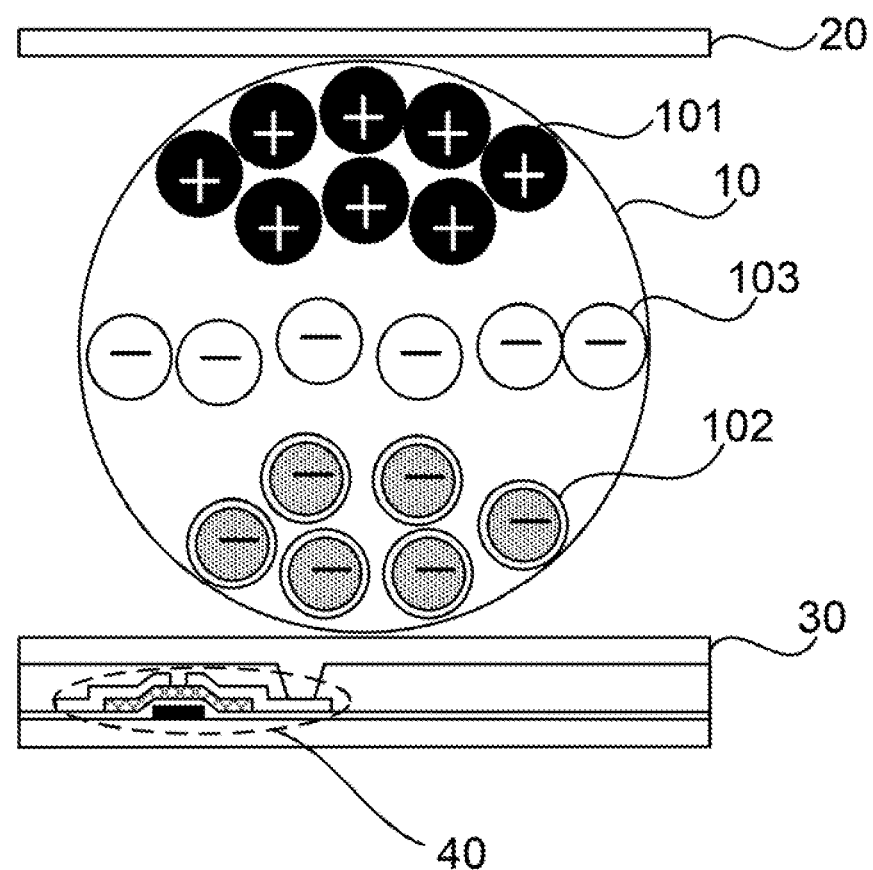
FIG. 10 is a structural diagram of yet another display panel, according to some embodiments.

In some embodiments, as shown in FIG. 10, the display panel 3 further includes a plurality of thin film transistors (TFTs) 40. A source or a drain of one thin film transistor 40 is electrically connected to at least one second electrode 30.

Here, a structure of each thin film transistor 40 is not limited, and the thin film transistor 40 may be a top gate thin film transistor 40 or a bottom gate thin film transistor 40 (as shown in FIG. 10).

The display panel 3 further includes a plurality of data lines. A voltage applied to the second electrode 30 may be controlled by inputting a corresponding voltage to the thin film transistor 40 through one data line electrically connected to this thin film transistor 40.

In some embodiments, as shown in FIG. 3, the at least one first electrode 20 includes a plurality of first electrodes 20 that are in one-to-one correspondence with the second electrodes 30. A region directly opposite to each first electrode 20 and a corresponding second electrode 30 is provided with at least one microcapsule 30 therein.

Figure 11:
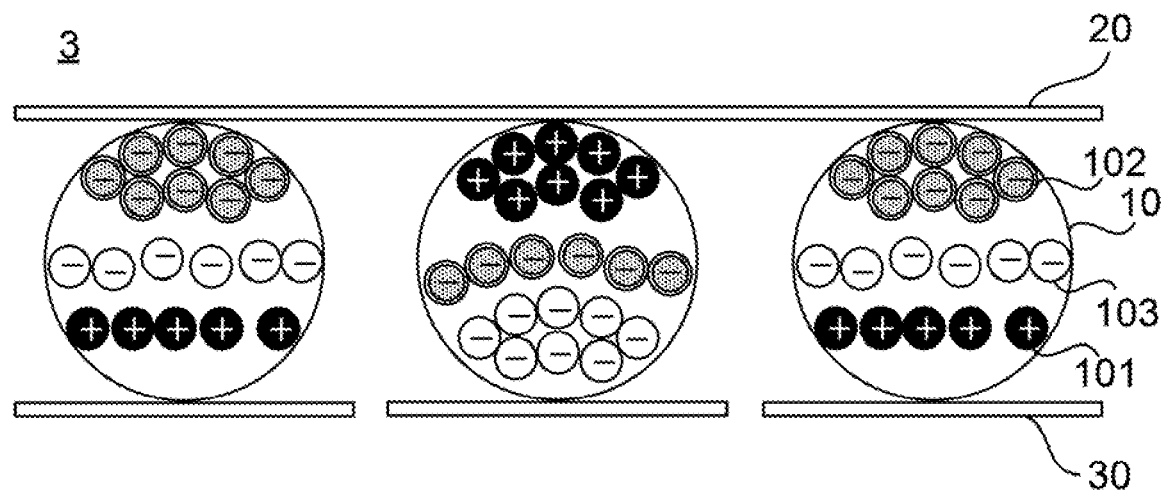
FIG. 11 is a structural diagram of yet another display panel, according to some embodiments.

In some other embodiments, as shown in FIG. 11, the at least one first electrode 20 includes one first electrode 20 with a planar structure. A region directly opposite to the first electrode 20 and each second electrode 30 is provided with at least one microcapsule 30 therein.

It is easy to understand that, in a case where the at least one first electrode 20 includes one planar first electrode 20 with a planar structure, by controlling a voltage applied to each second electrode 30, the first electrode 20 and the second electrodes 30 may be controlled to generate different electric fields, such as electric fields of different field strengths and different directions. In this way, microcapsules 10 in regions between the first electrode 20 and different second electrodes 30 may display different colors.

In some embodiments, the microcapsule 10 further includes a dispersion medium. The above-mentioned first, second and light-emitting particles are dispersed in the dispersion medium, so as to move under the action of the corresponding electric fields. The dispersion medium is, for example, an organic medium, such as one of polyurethane, tetrachloroethylene, dodecylbenzene, or the like. Or, the dispersion medium is an inorganic medium. A material of the dispersion medium is related to the materials of the above-mentioned particles, which is not limited in some embodiments of the present disclosure.

Figure 12:
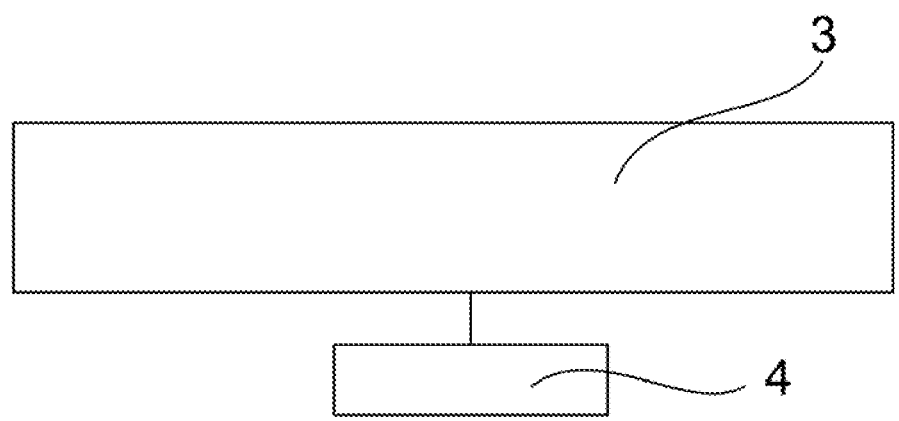
FIG. 12 is a structural diagram of an electronic paper display apparatus according to some embodiments.

Some embodiments of the present disclosure provide an electronic paper display apparatus. As shown in FIG. 12, the electronic paper display apparatus 100 includes the display panel 3 in the embodiments described above and a controller 4 electrically connected to the display panel 3.

The controller 4 may be part of or include an application specific integrated circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The controller 4 may include non-transitory memory (shared, dedicated, or group) that stores code executed by the controller 4.

Here, the electronic paper display apparatus 100 may further include a frame, a cover plate, a circuit board and other electronic accessories, which will be not described herein again.

The electronic paper display apparatus 100 provided by the embodiments of the present disclosure have the same beneficial effects as the display panel 3 described above. Since the above embodiments have described the beneficial effects of the display panel 3 in detail, which will be not described herein again.

Some embodiments of the present disclosure provide a control method of the electronic paper display apparatus. In the display panel 3 of the electronic paper display apparatus 100, the at least first electrode 20 is closer to the display side of the display panel 3 than the plurality of second electrodes 30. As shown in FIG. 13, the control method includes the following steps.

In S10, in a dark environment, a first voltage and a second voltage are respectively provided to a first electrode 20 and a second electrode 30 opposite thereto by the controller 4, so that a plurality of light-emitting particles 102 in a microcapsule 10 located between the first electrode 20 and the second electrode 30 move to a position closer to the first electrode 20 than a plurality of first particles 101 in the microcapsule 10.

In some embodiments, in the case where the microcapsule 10 further includes a plurality of charged second particles 103 of a second color (as shown in FIG. 6), S10 includes: providing, by the controller 4, the first voltage and the second voltage to the first electrode 20 and the second electrode 30 respectively, at least one of the first voltage or the second voltage alternating between positive and negative, so that a first electric field and a second electric field are alternately generated between the first electrode 20 and the second electrode 30.

A direction of the first electric field is opposite to a direction of the second electric field. A duration of one of the first electric field and the second electric field is greater than a duration of the other.

In some embodiments of the present disclosure, voltages that alternate between positive and negative may be applied to the first electrode 20 and/or the second electrode 30, so that the first electrode 20 and the second electrode 30 generate alternating first electric field and second electric field.

In some examples, a first voltage applied to the first electrode 20 does not change, and a second voltage that alternates between positive and negative may be applied to the second electrode 30, and a duration of the positive second voltage is different from a duration of the negative second voltage. In some other examples, a second voltage applied to the second electrode 30 does not change, and a first voltage that alternates between positive and negative may be applied to the first electrode 20, and a duration of the positive first voltage is different from a duration of the negative first voltage. In some yet other examples, voltages that both alternate between positive and negative may be applied to the first electrode 20 and the second electrode 30. It should be understood that, in a case where the at least one first electrode 20 includes one first electrode 20 with a planar structure (as shown in FIG. 11), the second electrode 30 is applied with the second voltage that alternates between positive and negative.

In some embodiments, the first voltage applied to the first electrode 20 does not change, and the second voltage that alternates between positive and negative is applied to the second electrode 30. For example, as shown in FIG. 14A, the first electrode 20 may be grounded (that is, the first voltage is a zero voltage), and a positive second voltage (e.g., +5 V) and a negative second voltage (e.g., −5 V) may be alternately applied to the second electrode 30. When the negative second voltage is applied to the second electrode 30, an electric field generated between the first electrode 20 and the second electrode 30 may be referred to as the first electric field, and a direction of the first electric field is directed from the first electrode 20 to the second electrode 30. When the positive second voltage is applied to the second electrode 30, the electric field generated between the first electrode 20 and the second electrode 30 may be referred to as the second electric field, and a direction of the second electric field is directed from the second electrode 30 to the first electrode 20. As shown in FIG. 14A, when time for applying the negative voltage to the second electrode 30 is longer than time for applying the positive voltage to the second electrode 30, that is, the duration of the negative second voltage is greater than the duration of the positive second voltage, a duration of the second electric field is greater than a duration of the first electric field.

Since a duration of one of the first electric field and the second electric field is greater than a duration of the other, the first particles 101 and the light-emitting particles 102 will move towards different electrodes under the action of the alternating first electric field and second electric field. Since the moving speed of the second particles 103 is greater than the moving speed of the light-emitting particles 102, and the light-emitting particles 102 and the second particles 103 have the same charge polarity, the light-emitting particles 102 and the second particles 103 may move in an oscillating manner under an alternating driving of the first electric field and second electric field. That is, the light-emitting particles 102 and the second particles 103 perform reciprocating motions with different amplitudes. As shown in FIG. 14A, since the duration of the negative second voltage having the same polarity as the light-emitting particles 102 is greater than the duration of the positive second voltage, finally, a stable state that the light-emitting particles 102 are closer to the first electrode 20 than the second particles 103, and the first particles 101 are closer to the second electrode 30 than the second particles 103, and the second particles 103 are located between the light-emitting particles 102 and the first particles 101 can be realized.

For example, the direction of the first electric field may be directed from the second electrode 30 to the first electrode 20, and the duration of the first electric field is greater than the duration of the second electric field. As shown in FIG. 8, under the action of the alternately generated first electric field and the second electric field, the light-emitting particles 102 are closer to the first electrode 20 than the second particles 103, and the first particles 101 are closer to the second electrode 30 than the second particles 103. That is, the second particles 103 are located between the first particles 101 and the light-emitting particles 102. In this case, a region of the display side of the display panel 3 opposite to the microcapsule 10 displays the color of the light emitted by the light-emitting particles 102.

In some embodiments, in the same period, polarities of the voltages applied to the first electrode 20 and the second electrode 30 on two opposite sides of the microcapsule 10 are opposite, so that the movement of the first particles 101, the light-emitting particles 102 and the second particles 103 are fast, which is beneficial to increase the response speed of the display panel 3. For example, a positive voltage may be applied to the second electrode 30 at the same time when applying a negative voltage to the first electrode 20. Or, a negative voltage may be applied to the second electrode 30 at the same time when applying a positive voltage to the first electrode 20.

In some embodiments, as shown in FIG. 13, the control method further includes the following steps. In S20, in a bright environment, a third voltage and a fourth voltage are respectively provided to the first electrode 20 and the second electrode 30 by the controller 4, so that a third electric field is generated between the first electrode 20 and the second electrode 30; or, in a bright environment, a fifth voltage and a sixth voltage are respectively provided to the first electrode 20 and the second electrode 30 by the controller 4, so that a fourth electric field is generated between the first electrode 20 and the second electrode 30.

A direction of the third electric field is opposite to a direction of the fourth electric field.

As shown in FIG. 7A, under the action of the third electric field, the first particles 101 in the microcapsule 10 move to a position closer to the first electrode 20 than the light-emitting particles 102 in the microcapsule 10, and the second particles 103 in the microcapsule 10 move to a position closer to the second electrode 30 than the light-emitting particles 102 in the microcapsule 10. That is, the light-emitting particles 102 are located between the first particles 101 and the second particles 103.

As shown in FIG. 7B, under the action of the fourth electric field, the first particles 101 in the microcapsule 10 move to a position closer to the second electrode 30 than the light-emitting particles 102 in the microcapsule 10, and second particles 103 in the microcapsule 10 move to a position closer to the first electrode 20 than the light-emitting particles 102 in the microcapsule 10. That is, the light-emitting particles 102 are located between the first particles 101 and the second particles 103.

It will be understood that, the direction of the third electric field is directed from the second electrode 30 to the first electrode 20, and the direction of the fourth electric field is directed from the first electrode 20 to the second electrode 30.

Figure 14B:
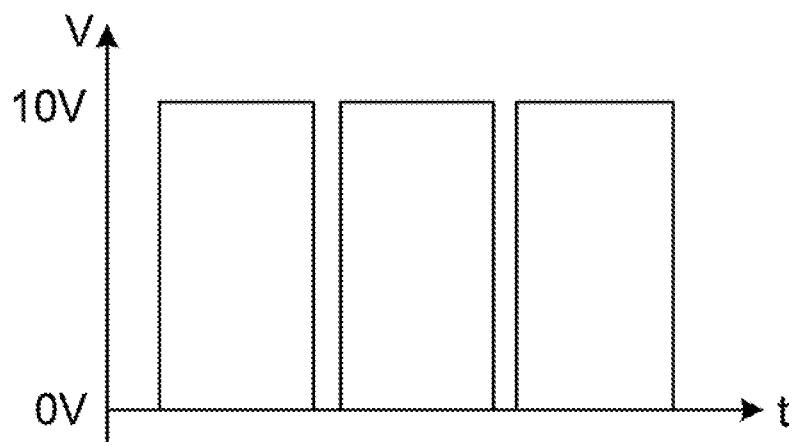
FIG. 14B is a schematic diagram of another voltage applied to a second electrode, according to some embodiments.
Figure 14C:
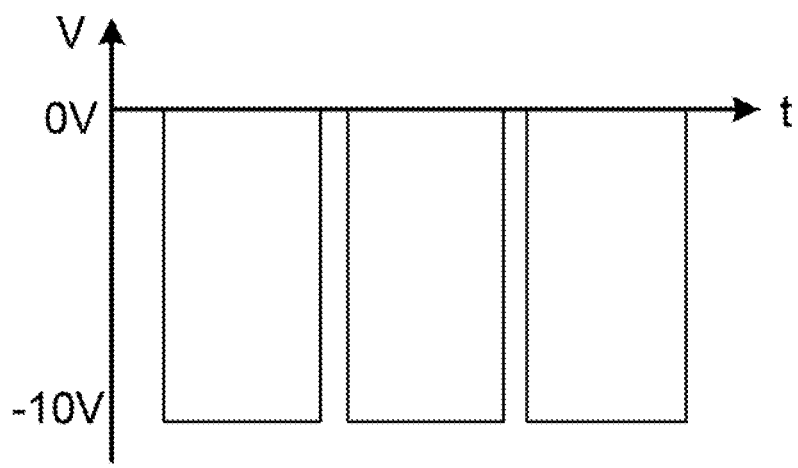
FIG. 14C is a schematic diagram of yet another voltage applied to a second electrode, according to some embodiments.

For example, as shown in FIG. 7A, the third electric field may be generated by applying a negative third voltage to the first electrode 20 and a positive fourth voltage to the second electrode (e.g., a pulse voltage with an effective voltage of +10 V, as shown in FIG. 14B). As shown in FIG. 7B, the fourth electric field may be generated by applying a positive fifth voltage to the first electrode 20 and a negative sixth voltage to the second electrode (e.g., a pulse voltage with an effective voltage of −10 V, as shown in FIG. 14C).

Referring to the related descriptions related to FIGS. 7A and 7B, based on the solution of the embodiments of the present disclosure, the display panel 3 may realize display based on the first particles 101 and the second particles 103 in the bright environment.

The control method of the electronic paper display apparatus provided by the embodiments of the present disclosure has the same beneficial effects as the display panel 3 in some of the above embodiments. Since the above embodiments have described the beneficial effects of the display panel 3 in detail, which will be not described herein again.

Some embodiments of the present disclosure provide a computer-readable storage medium (e.g. a non-transitory computer-readable storage medium). The computer readable storage medium has stored therein computer program instructions that, when executed by a processor, cause the processor to perform the control method of the electronic paper display apparatus as described in any one of the above embodiments.

For example, the computer-readable storage medium may include, but is not limited to: a magnetic storage device (e.g. a hard disk, a floppy disk, or a magnetic tape, etc.), an optical disk (e.g. a compact disk (CD), a digital versatile disk (DVD), etc.), a smart card or a flash memory device (e.g. an erasable programmable read-only memory (EPROM), a card, a stick or a key drive, etc.). The various computer-readable storage media described in the present disclosure may represent one or more devices and/or other machine-readable storage media for storing information. The term "machine-readable storage media" may include, but are not limited to, wireless channels and various other media capable of storing, containing, and/or carrying instructions and/or data.

Some embodiments of the present disclosure provide a computer program product. The computer program product includes computer program instructions that, when executed by a computer, cause the computer to perform the control method of the electronic paper display apparatus as described in the above embodiments.

Some embodiments of the present disclosure provide a computer program. When executed by a computer, the computer program causes the computer to perform the control method of the electronic paper display apparatus as described in the above embodiments.

The computer-readable storage medium, the computer program product and the computer program have the same beneficial effects as the control method of the electronic paper display apparatus as described in some embodiments of the present disclosure, which will be not described herein again.

The foregoing descriptions are merely specific implementation manners of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A display panel, comprising:
   at least one first electrode;
   a plurality of second electrodes opposite to the at least one first electrode; and
   a plurality of microcapsules disposed between the at least one first electrode and the plurality of microcapsules; wherein
   each microcapsule includes a plurality of charged first particles of a first color and a plurality of charged light-emitting particles; the plurality of light-emitting particles are configured to emit light; charge polarity of the plurality of first particles is opposite to charge polarity of the plurality of light-emitting particles, and the first color is different from a color of light emitted by the plurality of light-emitting particles;
   a material of the plurality of light-emitting particles includes a long afterglow luminescent material;
   each light-emitting particle includes:
      a light-emitting core made of a long afterglow luminescent material; and
      a light-transmitting protection layer covering an outside surface of the light-emitting core.

2. The display panel according to claim 1, wherein each microcapsule further includes a plurality of charged second particles of a second color; wherein
   charge polarity of the plurality of second particles is same as the charge polarity of the plurality of light-emitting particles, and a charge amount of each second particle is greater than a charge amount of each light-emitting particle; and the second color is different from the first color.

3. The display panel according to claim 2, wherein each first particle is a black particle, and each second particle is a white particle.

4. The display panel according to claim 2, wherein each first particle is a white particle, and each second particle is a black particle.

5. The display panel according to claim 1, wherein a material of the light-transmitting protection layer includes titanium dioxide.

6. The display panel according to claim 1, wherein the light emitted by the plurality of light-emitting particles is white light.

7. The display panel according to claim 1, wherein the light emitted by the plurality of light-emitting particles is light having a wavelength within a wavelength range of a color light.

8. The display panel according to claim 7, wherein the plurality of microcapsules include: a plurality of first microcapsules, a plurality of second microcapsules, and a plurality of third microcapsules; wherein colors of light emitted by light-emitting particles in the first microcapsules, the second microcapsules, and the third microcapsules are three primary colors; and
the display panel has a plurality of pixel regions, wherein each pixel region is provided with at least one first microcapsule, at least one second microcapsule, and at least one third microcapsule therein.

9. The display panel according to claim 1, wherein the plurality of microcapsules includes: a plurality of fourth microcapsules, a plurality of fifth microcapsules, and a plurality of sixth microcapsules; wherein colors of first particles in the fourth microcapsules, the fifth microcapsules, and the sixth microcapsules are three primary colors; and
the display panel has a plurality of pixel regions, wherein each pixel region is provided with at least one fourth microcapsule, at least one fifth microcapsule, and at least one sixth microcapsule therein.

10. The display panel according to claim 1, wherein the at least one first electrode includes one first electrode with a planar structure; and
a region directly opposite to the first electrode and each second electrode is provided with at least one microcapsule therein.

11. The display panel according to claim 1, wherein the at least one first electrode includes a plurality of first electrodes that are in one-to-one correspondence with the plurality of second electrodes; and
a region directly opposite to each first electrode and a corresponding second electrode is provided with at least one microcapsule therein.

12. The display panel according to claim 1, further comprising a plurality of thin film transistors, wherein a source or a drain of one of the plurality of thin film transistors is electrically connected to one of the plurality of second electrodes.

13. An electronic paper display apparatus, comprising:
the display panel according to claim 1; and
a controller electrically connected to the display panel.

14. A control method of an electronic paper display apparatus, wherein the electronic paper display apparatus comprises a display panel and a controller electrically connected to the display panel;
the display panel comprises:
at least one first electrode;
a plurality of second electrodes opposite to the at least one first electrode; and
a plurality of microcapsules disposed between the at least one first electrode and the plurality of microcapsules; wherein
each microcapsule includes a plurality of charged first particles of a first color and a plurality of charged light-emitting particles; the plurality of light-emitting particles are configured to emit light; charge polarity of the plurality of first particles is opposite to charge polarity of the plurality of light-emitting particles, and the first color is different from a color of light emitted by the plurality of light-emitting particles;
a material of the plurality of light-emitting particles includes a long afterglow luminescent material;
each light-emitting particle includes:
a light-emitting core made of a long afterglow luminescent material; and
a light-transmitting protection layer covering an outside surface of the light-emitting core;
in the display panel, the at least first electrode is closer to a display side of the display panel than the plurality of second electrodes; the control method comprises:

providing, by the controller, a first voltage and a second voltage to a first electrode and a second electrode opposite thereto respectively in a dark environment, so that a plurality of light-emitting particles in a microcapsule located between the first electrode and the second electrode move to a position closer to the first electrode than a plurality of first particles in the microcapsule.

15. The control method according to claim 14, wherein the microcapsule further includes a plurality of charged second particles of a second color; wherein charge polarity of the plurality of second particles is same as the charge polarity of the plurality of light-emitting particles, and a charge amount of each second particle is greater than a charge amount of each light-emitting particle; and the second color is different from the first color;
   providing, by the controller, a first voltage and a second voltage to a first electrode and a second electrode opposite thereto respectively in a dark environment, so that a plurality of light-emitting particles in a microcapsule located between the first electrode and the second electrode move to a position closer to the first electrode than a plurality of first particles in the microcapsule, includes:
   providing, by the controller, the first voltage and the second voltage to the first electrode and the second electrode respectively, at least one of the first voltage or the second voltage alternating between positive and negative, so that a first electric field and a second electric field are alternately generated between the first electrode and the second electrode; wherein a direction of the first electric field is opposite to a direction of the second electric field; and
   a duration of one of the first electric field and the second electric field is greater than a duration of an other; and
   in response to the first electric field and the second electric field that are alternately generated, the plurality of light-emitting particles move to the position closer to the first electrode than the plurality of second particles, the plurality of first particles move to a position closer to the second electrode than the plurality of second particles, and the plurality of second particles move to a position between the plurality of light-emitting particles and the plurality of first particles.

16. The control method according to claim 15, wherein in a same period, polarities of the first voltage and the second voltage are opposite.

17. The control method according to claim 15, further comprising:
   providing, by the controller, a third voltage and a fourth voltage to the first electrode and the second electrode respectively in a bright environment, so that a third electric field is generated between the first electrode and the second electrode; or
   providing, by the controller, a fifth voltage and a sixth voltage to the first electrode and the second electrode respectively in a bright environment, so that a fourth electric field is generated between the first electrode and the second electrode; wherein
   a direction of the third electric field is opposite to a direction of the fourth electric field;
   in response to the third electric field, the plurality of first particles move to a position closer to the first electrode than the plurality of light-emitting particles, the plurality of second particles move to a position closer to the second electrode than the plurality of light-emitting particles, and the plurality of light-emitting particles move to a position between the plurality of first particles and the plurality of second particles; and
   in response to the fourth electric field, the plurality of first particles move to a position closer to the second electrode than the plurality of light-emitting particles, the plurality of second particles move to a position closer to the first electrode than the plurality of light-emitting particles, and the plurality of light-emitting particles move to a position between the plurality of first particles and the plurality of second particles.

* * * * *